(12) United States Patent
Tsai et al.

(10) Patent No.: US 6,566,522 B2
(45) Date of Patent: May 20, 2003

(54) DYES FOR RECORDING LAYER OF THE HIGH DENSITY OPTICAL RECORDING DISC

(75) Inventors: Song-Yeu Tsai, Taipei (TW); Tien-Tsan Hung, Hsinchu (TW); Shih-Peng Hsu, Hsinchu (TW); Hao-Hsien Chiang, Yunghe (TW)

(73) Assignee: Industrial Technology Research Institute, Hsin-Chu Hsien (TW)

( * ) Notice: Subject to any disclaimer, the term of this patent is extended or adjusted under 35 U.S.C. 154(b) by 0 days.

(21) Appl. No.: 10/206,208

(22) Filed: Jul. 29, 2002

(65) Prior Publication Data

US 2003/0031955 A1 Feb. 13, 2003

(30) Foreign Application Priority Data

Aug. 1, 2001 (TW) .......................................... 90118702 A

(51) Int. Cl.⁷ .......................... C07D 491/12; C09B 67/26; C09B 67/34

(52) U.S. Cl. ............................................. 546/37; 8/644

(58) Field of Search ................................. 546/37; 8/644

(56) References Cited

U.S. PATENT DOCUMENTS 6,358,684 B1 * 3/2002 Lee ................................ 435/6

\* cited by examiner

*Primary Examiner*—C. S. Aulakh
(74) *Attorney, Agent, or Firm*—Bacon & Thomas, PLLC

(57) ABSTRACT

The present invention provides a rhodamine dye for recording layer of the high density optical recording disc, which has a chemical structure as shown in (I):

Chemical Structure (I)

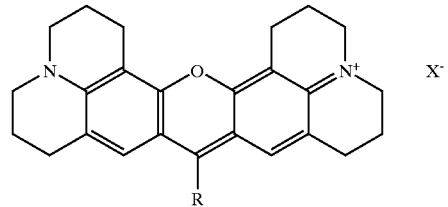

where $X^-$ represents an acid anion and R represents a benzoic acid group, benzene sulfonic acid group or benzoic ester group. The dye of the present invention is applicable to recording layer of the high density optical recording disc after prepared appropriately. The dye of the present invention is cost efficient and simple in synthesis and purification.

9 Claims, 3 Drawing Sheets

DYES FOR RECORDING LAYER OF THE HIGH DENSITY OPTICAL RECORDING DISC

BACKGROUND OF THE INVENTION

1. Field of the Invention

The present invention relates generally to a dye for recording layer of the high density recordable disc, especially to a dye that is simple in synthesis and purification, cost efficient and applicable to recording layer of the high density recordable disc when prepared appropriately.

2. Description of the Prior Art

A storage medium must have the advantages of higher density, smaller size and lower cost in order to meet the demand for the circulation of information in the quickly developed era nowadays. As magnetic storage medium is not capable to satisfy these requirements, optical storage medium is greatly sought for as an alternative. Optical recording disc is growing very quickly in global market, thus developing cheaper and better quality optical recording materials are the goal of the invention.

Cyanine dyes, phthalocyanine dyes and azo dyes are three commonly used dyes for recording layer of the optical recording disc. The prior art dyes claimed in U.S. Pat. No. 5,958,087 and applied to recording layer of the optical recording disc are cyanine dyes with a refractive index n between 1.6 to 4.0 and an extinction coefficient between 0.01 to 0.45. The prior art dyes claimed in U.S. Pat. No. 6,169,721B1 and applied to recording layer, with an absorbency between 0.65 to 0.75, of the high density optical recording disc are azo dyes. In other words, the prior art technologies use either cyanine dye series or aze dye series as the recording material for optical recording discs. However, since the cost of such dyes is high and the steps for the synthesis and purification of such dyes are complicated, they are not capable to meet the huge demand of the market. It is, therefore, a tendency to use a dye that is cost efficient, simple in synthesis and purification, and applicable to high-density recording layers.

SUMMARY OF THE INVENTION

The primary objective of the present invention is to provide a rhodamine dye for recording layer of the high density optical recording disc in order to solve and remove the aforementioned problems.

The second objective of the present invention is to provide a rhodamine dye for recording layer of high density optical recording disc; the dye is simple in synthesis and purification and cost efficient, being capable to reduce the production cost substantially.

To achieve the aforementioned objectives, the present invention provides a rhodamine dye for recording layer of the high density optical recording disc, which has a chemical structure as shown in (I):

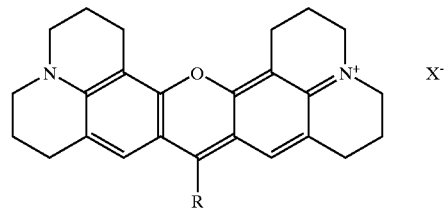

Chemical Structure (I)

where $X^-$ represents an acid anion and R represents a benzoic acid group, benzene sulfonic acid group or benzoic ester group. The dye of the present invention is applicable to recording layer of the high density optical recording disc after prepared appropriately.

DETAILED DESCRIPTION OF PREFERRED EMBODIMENT

The present invention provides a rhodamine dye for recording layer of the high density optical recording disc. The rhodamine dye has a chemical structure as shown in (I):

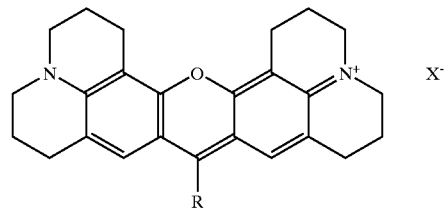

Chemical Structure (I)

where $X^-$ is an acid anion selected from $ClO_4^-$, $PF_6^-$, $SbF_6^-$, $BF_4^-$ or $SO_3^-$, while R is selected from Benzoic Acid group (para, ortho, meta), benzene sulfonic acid group (para, ortho, meta) or benzoic ester group (para, ortho, meta). A chemical structure of R is shown as follows:

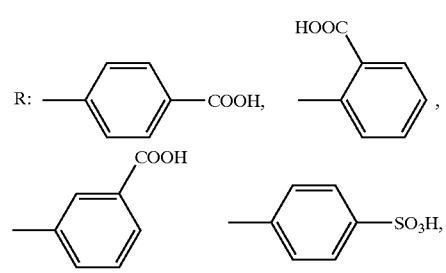

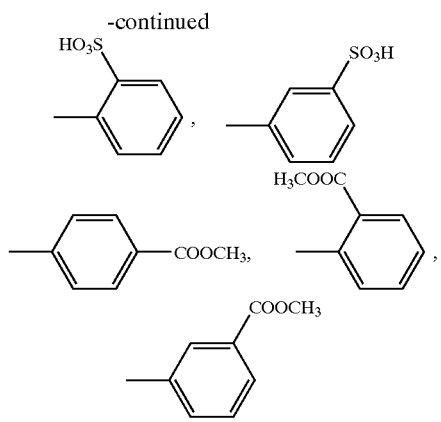
-continued

The agent prepared appropriately with X⁻ and R is capable to be used as a dye for recording layer of the optical recording disc. The rhodamine dye is coated on a clear substrate having annular grooves and a thickness of 0.6 mm to form a recording layer. The depth of the annular grooves is between 160 to 190 nm and the width thereof is between 0.25 to 0.35 μm. The rhodamine dye with a weight percentage concentration of 1 to 2% is preferred to form the recording layer.

The absorbency of the recording layer is limited between 0.23 to 0.32 by controlling the thickness of the recording layer. An optical laser pick-up head with a wavelength between 600 to 700 nm and a objective lens having a numerical aperture between 0.55 to 0.70 to record and reproduce data. The recording power of the optical pick-up head is between 7 to 12 mW and the best writing power is 9.5 mW. A metal reflecting layer with a thickness between 50 to 150 nm and a protective layer are formed sequentially on the recording layer. The metal reflecting layer may be gold, silver, copper, aluminum or various alloys. A protective layer with a thickness of 5 μm is formed by spin coating and hardened by ultraviolet ray. Then, an adhesive is coated by screen printing to bind a dummy substrate and the double-sided disc to produce a high density optical recording disc with a thickness of 1.2 mm.

To make the aforementioned objectives, features and advantages more understandable, the following embodiments and applications are described to explain the dye for recording layer of high density optical recording disc of the present invention in detail.

[Embodiment I] Synthesis

Figure 1:
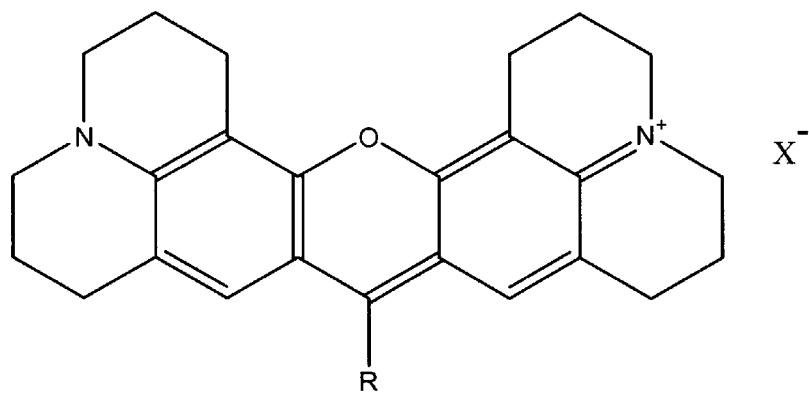
FIG. 1 shows a chemical structure of a rhodamine dye of the present invention (I)
Figure 2:
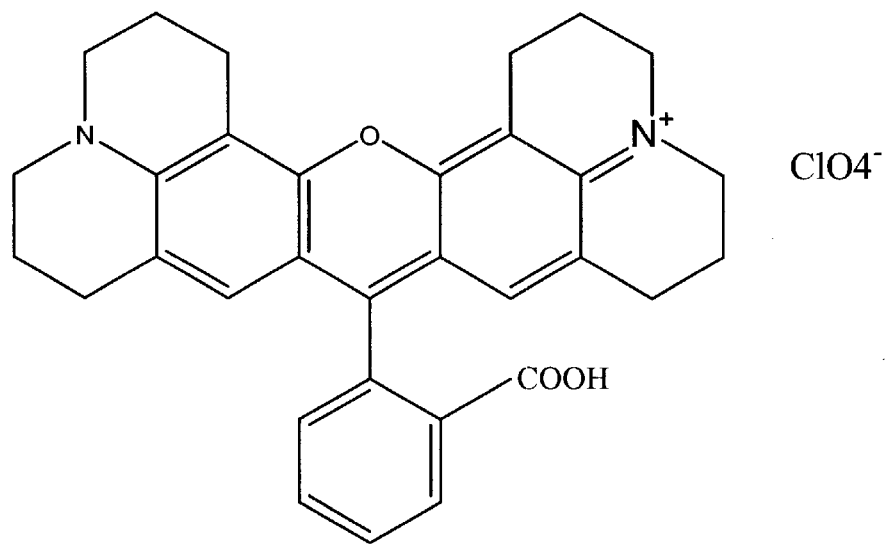
FIG. 2 shows another chemical structure of the rhodamine dye of the present invention (II)
Figure 3:
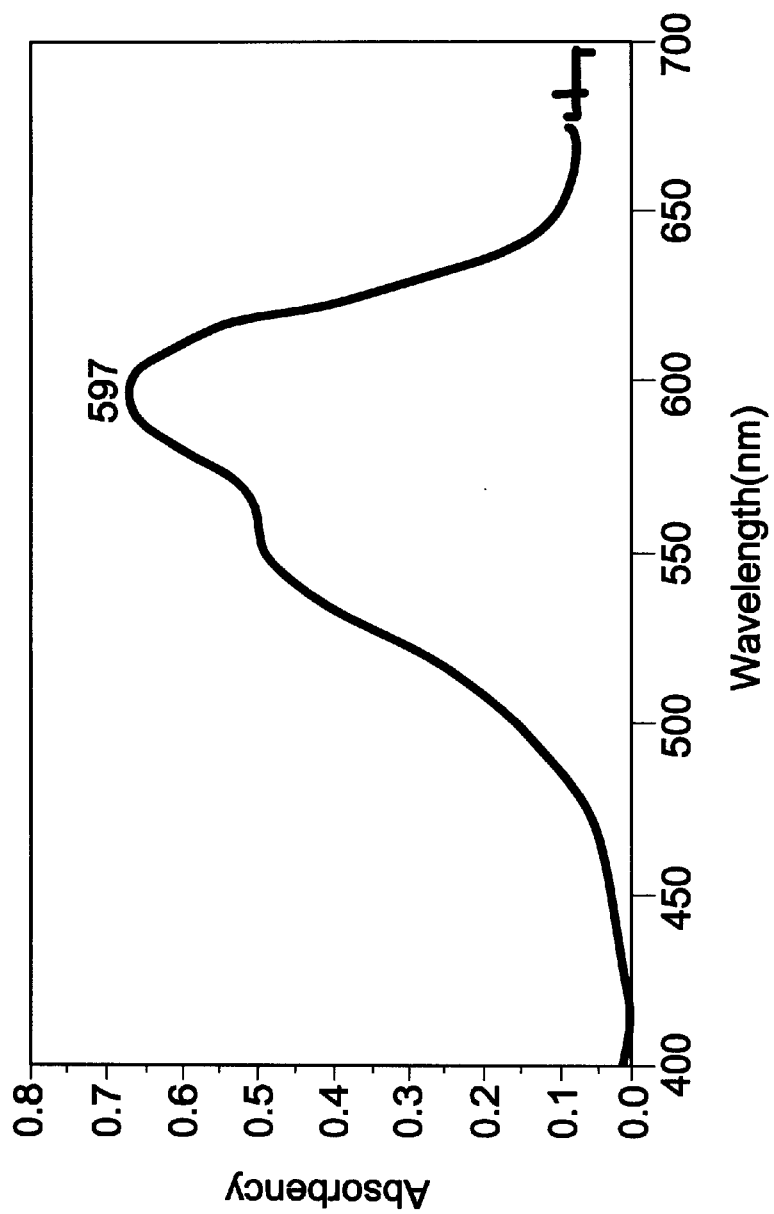
FIG. 3 shows an absorption spectrum when the rhodamine dye is filmed on a polycarbonate substrate.

The chemical structure (II) for the preparation of the invented rhodamine dye for recording layer of the high density optical recording disc is shown in FIG. 2. The preparation contains the following steps:

Put 5.68 g (30 mmol) of 8-hydroxyjulolidine, 4.72 g (32 mmol) of phthalic anhydride and 60 g of o-dichlorobenzene in a three-neck flask (250 ml) with a built-in mixer. Mix the solution for about 30 minutes and dropwise 3.8 g (20 mmol) of 8-hydroxyjulolidine in the mixture over the course of 1 hour. Stir the solution and heat it to reflux temperature. Stir the solution further under this temperature for about 3 hours. Cool the solution to room temperature and pour the resultant violet colloid reactant in 66 g of NaOH with a concentration of 4%. Stir the mixture for about 1 hour and extract three times with methylene chloride. Soxlet the organic solution on the top layer with deionized water and dry out the water left with MgSO₄. Filter the reactant with filter paper and concentrate it with an evaporator. Suspend the concentrated reactant in n-hexane (550 ml) and filter out and collect solid substance after stirring vigorously for 4 hours. Dry the solid substance under 85° C. for 50 hours to produce 12 g of red-brown powder, equal to a production yield of 85%. Put the powder in 60 ml of methanol with 31 g (25 mmol) of NaClO₄. Stir the mixture, leave it overnight, then put it to ice bath for 15 minutes and filter it to produce the dye with the chemical structure as shown in (II). FIG. 3 shows the absorption spectrum of the film, which of λmax is about 597 nm.

[Embodiment II] Application

Dissolve the rhodamine dye in 2, 2, 3, 3-tetrafluoropropanol (TFP). In addition to TFP, alcohol (methanol, ethanol), ketone (acetone, MEK) or haloalkane (such as chloroform) may also be used as solvent. The weight percentage concentration is between 0.5 to 5% and the dye solution with a concentration of 1 to 2% is preferred. Use a spin coater to coat the dye on a PC substrate with a thickness of 0.6 mm, which is controlled by the concentration of the dye, the spin speed of the coater and the amount of the injection. Measure the optical density of the recording layer with an optical density meter (OD Meter). Sputter a metal reflecting layer on the dye and control the thickness of the reflecting layer with sputtering current and time. The metal reflecting layer may be made of gold, silver, copper, aluminum of various alloys and the thickness thereof is between 50 to 150 nm, particularly a thickness between 80 to 110 nm is preferred. A protective layer with a thickness of about 5 μm is coated on the metal reflecting layer and hardened by using ultraviolet ray. Then, coat a adhesive by screen printing to bind a dummy substrate and the double-sided disc to produce a high density optical recording disc with a thickness of 1.2 mm.

[Embodiment III] Application

Weigh an appropriate amount of the rhodamine dye and put it in TFP to prepare a solution with a weight percentage concentration of 1.2%. Coat this solution with a spin coater on a polycarbonte substrate with a track pitch of 0.8 μm, a groove depth of 170 nm and a groove width of 0.28 μm. The absorbency of this recording layer is controlled at about 0.25. A layer of silver with a thickness of about 100 nm is sputtered on the recording layer to act as a reflecting layer. Then, coat a protective layer made of UV-curing resin with the spin coater and bind a dummy substrate and the double-sided disc to produce a high density optical recording disc with a thickness of 1.2 mm.

The electric characteristics of the produced optical recording disc is tested with the DDU-1000 (laser wavelength 635 nm, objective lens numerical aperture 0.6) produced by Pulstec company under CLV=3.84 m/s. When writing EFM+ with random signal under 9.5 mW and reading the data under 0.7 mW, the jitter is about 8.4%.

[Embodiment IV] Application

Weigh an appropriate amount of the rhodamine dye and put it in TFP to prepare a solution with a weight percentage concentration of 1.2%. Coat this solution with a spin coater on a polycarbonate substrate with a track pitch of 0.74 μm, a groove depth of 170 nm and a groove width of 0.3 μm. The absorbency of this recording layer is controlled at about 0.28. A metal reflecting layer with a thickness of about 100 nm is sputtered on the recording layer. Then, coat a protective layer made of UV-curing resin with the spin coater and bind a dummy substrate and the double-sided disc to produce a high density optical recording disc with a thickness of 1.2 mm.

The electric characteristics of the produced optical recording disc is tested with the DDU-1000 (laser wavelength 635 nm, objective lens numerical aperture value 0.6) produced by Pulstec company under CLV=3.49 m/s. When writing EFM+ with random signal under 9.5 mW and reading the data under 0.7 mW, the jitter is about 7.4%.

[Embodiment V] Application

Figure 4:
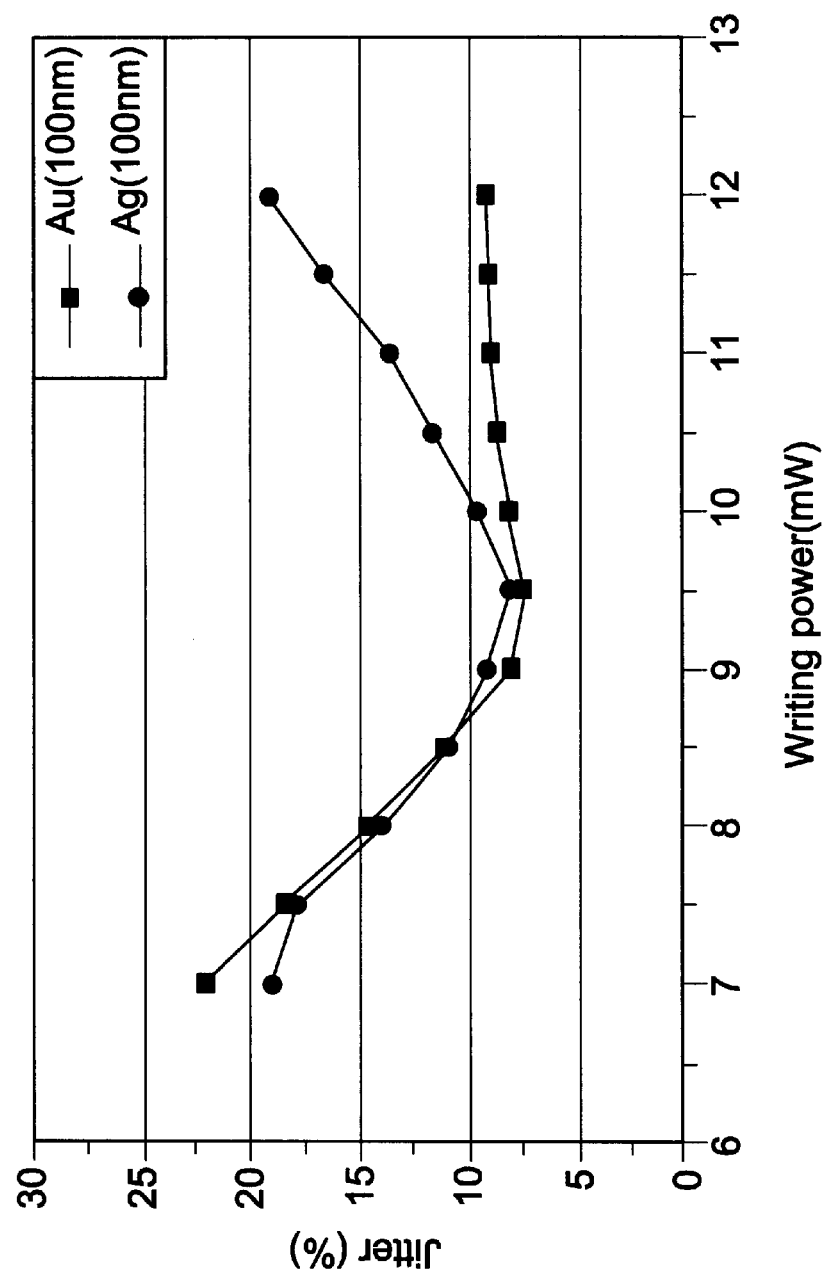
FIG. 4 shows the effect of writing power on jitter when metal reflecting layers with different materials are applied individually to the present invention.

Based on the process stated in embodiment IV, sputter a gold reflecting layer and a silver reflecting layer on each of two rhodamine dyes recording layers with an absorbency of 0.28, respectively. FIG. 4 shows the effect of the writing power of these two optical recording discs on jitter tested with DDU-1000. The curve of jitter against writing power is in a U shape and the jitter of the optical recording disc coated with gold reflecting layer is 7.4%, better than the optical recording disc coated with silver reflecting layer.

While the present invention has been shown and described with reference to preferred embodiments thereof, and in terms of the illustrative drawings, it should be not considered as limited thereby. Various possible modifications, omission and alterations could be conceived of by one skilled in the art to the form and the contents of any particular embodiment, without departing from the scope and the spirit of the present invention.

What is claimed is:

1. A dye for recording layer of the high density optical recording disc, comprising a chemical structure (I):

Chemical Structure (I)

wherein $X^-$ is an acid anion and R is a benzoic acid group, benzene sulfonic acid group or benzoic ester group.

2. The dye for recording layer of the high density optical recording disc as claimed in claim 1, wherein R is selected from ortho—benzoic acid, para—benzoic acid and meta—benzoic acid.

3. The dye for recording layer of the high density optical recording disc as claimed in claim 1, wherein $X^-$ is selected from $ClO_4^-$, $PF_6^-$, $SbF_6^-$, $BF_4^-$ or $SO_3^-$.

4. The dye for recording layer of the high density optical recording disc as claimed in claim 1, wherein a high density optical recording disc has:

a groove substrate with an annular groove;

a recording layer coated on said groove substrate;

a metal reflecting layer coated on said recording layer;

a protective layer coated on said metal reflecting layer; and a dummy substrate bounded on said protective layer.

5. The groove substrate of the high density optical recording disc as claimed in claim 4, wherein said groove substrate has a depth between 160 to 190 nm and a width between 0.25 to 0.35 μm.

6. The recording layer of the high density optical recording disc as claimed in claim 4, wherein a thickness of said recording layer is so controlled that absorbency thereof is between 0.23 to 0.32.

7. The recording layer of the high density optical recording disc as claimed in claim 4, wherein a rhodamine dye solution with a weight percentage concentration between 1 to 2% is preferred.

8. The metal reflecting layer of the high density optical recording disc as claimed in claim 4, wherein said metal reflecting layer is made of each one of gold, silver, copper, aluminum and other alloys.

9. The metal reflecting layer of the high density optical recording disc as claimed in claim 4, wherein the thickness of said metal reflecting layer is between 50 to 150 nm.

* * * * *